United States Patent
Hillan

(10) Patent No.: US 9,054,750 B2
(45) Date of Patent: Jun. 9, 2015

(54) METHODS AND APPARATUS FOR IMPROVING RF DISCOVERY FOR PEER MODE COMMUNICATIONS

(75) Inventor: John Hillan, Farnborough (GB)

(73) Assignee: QUALCOMM Incorporated, San Diego, CA (US)

( * ) Notice: Subject to any disclaimer, the term of this patent is extended or adjusted under 35 U.S.C. 154(b) by 413 days.

(21) Appl. No.: 13/453,078

(22) Filed: Apr. 23, 2012

(65) Prior Publication Data

US 2013/0281013 A1    Oct. 24, 2013

(51) Int. Cl.
| | |
|---|---|
| H04B 5/00 | (2006.01) |
| H04B 5/02 | (2006.01) |
| H04W 8/00 | (2009.01) |
| H04W 52/02 | (2009.01) |
| H04W 76/02 | (2009.01) |

(52) U.S. Cl.
CPC .......... *H04B 5/02* (2013.01); *H04W 8/005* (2013.01); *H04W 76/023* (2013.01); *H04W 76/02* (2013.01); *H04W 52/0277* (2013.01)

(58) Field of Classification Search
USPC ....................... 455/41.1, 41.2, 41.3
See application file for complete search history.

(56) References Cited

U.S. PATENT DOCUMENTS

| | | | |
|---|---|---|---|
| 6,430,395 B2 * | 8/2002 | Arazi et al. .................. 455/41.2 |
| 6,982,644 B2 * | 1/2006 | McDaniel et al. ......... 340/572.1 |
| 7,493,082 B2 | 2/2009 | Perttila | |
| 7,652,578 B2 | 1/2010 | Braun et al. | |
| 7,680,520 B2 | 3/2010 | Ruuska et al. | |
| 7,711,323 B2 | 5/2010 | Fujii | |
| 7,729,689 B2 | 6/2010 | Chakraborty et al. | |
| 7,734,307 B2 | 6/2010 | Dawidowsky | |
| 7,738,494 B2 | 6/2010 | Takayama | |
| 7,742,744 B2 | 6/2010 | Twitchell, Jr. | |
| 7,849,139 B2 | 12/2010 | Wolfson et al. | |
| 7,882,541 B2 | 2/2011 | Yasaki et al. | |
| 7,929,910 B2 | 4/2011 | Chen | |
| 7,980,469 B2 | 7/2011 | Matsuo | |

(Continued)

FOREIGN PATENT DOCUMENTS

| | | |
|---|---|---|
| EP | 1653632 A1 | 5/2006 |
| EP | 2112634 A1 | 10/2009 |

(Continued)

OTHER PUBLICATIONS

International Search Report and Written Opinion—PCT/US2013/037220—ISA/EPO—Jul. 15, 2013.

(Continued)

*Primary Examiner* — Andrew Wendell
*Assistant Examiner* — Maryam Soltanzadeh
(74) *Attorney, Agent, or Firm* — Charles E. Eggers

(57) ABSTRACT

Aspects disclosed herein relate to providing peer mode passive communications while accounting for a power level available to operate a NFC device. In the disclosed aspects, a near field communication (NFC) device may be equipped to detect a value for a power level available to operate the NFC device. The NFC device may be further equipped to determine a first duration to allocate for a listening mode and a second duration to allocate for a polling mode based at least in part on the determined available power level value and select a RF discovery loop based on the determined first duration and second duration. The NFC device may be further operable to perform peer mode discovery using the selected RF discovery loop.

40 Claims, 7 Drawing Sheets

(56) References Cited

U.S. PATENT DOCUMENTS

| | | | |
|---|---|---|---|
| 8,018,344 B2 | 9/2011 | Chang et al. | |
| 8,060,012 B2 | 11/2011 | Sklovsky et al. | |
| 8,068,011 B1 | 11/2011 | Sajadi et al. | |
| 8,112,066 B2 | 2/2012 | Ben | |
| 8,116,680 B2 | 2/2012 | Bloebaum et al. | |
| 8,140,053 B2 | 3/2012 | Jatschka et al. | |
| 8,199,766 B2 | 6/2012 | Li et al. | |
| 8,224,243 B2 | 7/2012 | Takayama et al. | |
| 8,240,568 B2 | 8/2012 | Matsuo | |
| 8,290,480 B2 | 10/2012 | Abramson et al. | |
| 8,395,478 B2 | 3/2013 | Diab et al. | |
| 8,401,596 B2 | 3/2013 | Takayama | |
| 8,428,518 B2 * | 4/2013 | Cordeiro | 455/63.1 |
| 8,433,375 B2 | 4/2013 | Yamazaki et al. | |
| 8,537,907 B2 | 9/2013 | Sung | |
| 8,676,277 B2 | 3/2014 | Takayama | |
| 2005/0077356 A1 | 4/2005 | Takayama et al. | |
| 2006/0142034 A1 | 6/2006 | Wentink et al. | |
| 2006/0286937 A1 | 12/2006 | Russell et al. | |
| 2008/0224825 A1 | 9/2008 | Nystrom et al. | |
| 2009/0209223 A1 | 8/2009 | Kone et al. | |
| 2009/0247077 A1 | 10/2009 | Sklovsky et al. | |
| 2010/0136908 A1 | 6/2010 | Hwang et al. | |
| 2010/0144269 A1 | 6/2010 | Do et al. | |
| 2010/0213895 A1 | 8/2010 | Keating et al. | |
| 2010/0279606 A1 | 11/2010 | Hillan et al. | |
| 2010/0311326 A1 | 12/2010 | Klabunde et al. | |
| 2011/0022755 A1 | 1/2011 | Sueyoshi et al. | |
| 2011/0161697 A1 | 6/2011 | Qi et al. | |
| 2011/0226853 A1 | 9/2011 | Soh et al. | |
| 2011/0312279 A1 | 12/2011 | Tsai et al. | |
| 2012/0045989 A1 | 2/2012 | Suumaeki et al. | |
| 2012/0135683 A1 * | 5/2012 | Lee et al. | 455/41.2 |
| 2012/0309302 A1 * | 12/2012 | Buhot | 455/41.1 |
| 2013/0036050 A1 | 2/2013 | Giordano et al. | |
| 2013/0084803 A1 * | 4/2013 | Hall et al. | 455/41.1 |
| 2013/0143487 A1 | 6/2013 | Hillan | |
| 2013/0203349 A1 | 8/2013 | Hillan et al. | |
| 2013/0244578 A1 * | 9/2013 | Bacioccola | 455/41.2 |
| 2013/0281014 A1 * | 10/2013 | Frankland et al. | 455/41.1 |
| 2013/0309965 A1 | 11/2013 | Hillan | |

FOREIGN PATENT DOCUMENTS

| | | |
|---|---|---|
| GB | 2328588 A | 2/1999 |
| JP | 2005018166 A | 1/2005 |
| WO | WO2007102115 A1 | 9/2007 |
| WO | 2009009545 A2 | 1/2009 |
| WO | 2011041383 A1 | 4/2011 |

OTHER PUBLICATIONS

Santosh Abraham (Qualcomm Inc): "Efficient Device and Service Discovery for Peer-to-Peer (P2P) scenarios; 11-11-1517-00-0wng-efficient-device-and-service-di scovery-for-peer-to-peer-p2p-scenarios", IEEE SA Mentor; 11-11-1517-00-OWNG-Efficient-Device-And-Service-Discovery-For-Peer-To-Peer-P2P-Scena Rios, IEEE-SA Mentor, Piscataway, NJ USA, vol. 802.11 WNG, Nov. 7, 2011, pp. 1-15, XP068037853, [retrieved on Nov. 7, 2011] p. 9.

* cited by examiner

METHODS AND APPARATUS FOR IMPROVING RF DISCOVERY FOR PEER MODE COMMUNICATIONS

BACKGROUND

1. Field

The disclosed aspects relate generally to communications between and/or within devices and specifically to methods and systems for improving a radio frequency (RF) discovery process associated with peer mode passive communication connection establishment.

2. Background

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Many such cellular telephones are being manufactured with relatively large increases in computing capabilities, and as such, are becoming tantamount to small personal computers and hand-held PDAs. Further, such devices are being manufactured to enable communications using a variety of frequencies and applicable coverage areas, such as cellular communications, wireless local area network (WLAN) communications, near field communication (NFC), etc.

NFC enabled devices may operation in a polling mode and/or a listening mode. When operating in a polling mode a device generates an RF carrier that can supply energy to a remote device. The polling device may modulate the RF carrier appropriately in order to begin communication with the remote device. When operating in a listening mode a device does not generate any RF carrier, but when exposed to a carrier from a remote device, the device may harvest energy from the field, and decode the incoming modulation to begin communication. Once communications have been established, the peer devices remain fixed in their respective polling or listening modes. Such communications are referred to as passive communications (e.g., ISO 18092 Passive Communication). At present, a NFC device is only operable to communication using ISO 18092 Passive Communication. As such, once a link is established, the role as polling or listening device is fixed for the communication duration. For peer mode operation, this communication duration may last longer than a brief "touch to do" operation such as transit access or pay by mobile.

Because of the polling device generates the RF carrier that supplies energy to the remote peer device, and because the roles of the polling device and listening device are fixed for the duration of peer communications, the power usage requirements on the polling device may be disproportionally greater than power usage requirements on the listening device (e.g., the polling device may use many tens of milliamps just to drive the antenna). During RF discovery a device may generally alternate periodically between polling and listening modes. In other words, currently it is a matter of chance which peer device will end up being the polling device once communication is established. As such, a device that is operating in a low available power range may still be responsible for power requirements associated with being a polling device in peer communications, irrespective of available power levels associated with the peer device. Thus, improved apparatus and methods for providing peer mode passive communications that take into account a power level available to operate a NFC device may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with providing peer mode passive communications while accounting for a power level available to operate a NFC device. In one example, a NFC device may be equipped to detect a value for a power level available to operate the NFC device. The NFC device may be further equipped to determine a first duration to allocate for a listening mode and a second duration to allocate for a polling mode based at least in part on the determined available power level value and select a RF discovery loop based on the determined first duration and second duration. The NFC device may be further operable to perform peer mode discovery using the selected RF discovery loop.

According to related aspects, a method for providing improved peer mode passive communications for a NFC device is provided. The method can include detecting a value for a power level available to operate a NFC device. Further, the method may include determining a first duration to allocate for a listening mode and a second duration to allocate for a polling mode based at least in part on the determined available power level value. Further, the method may include selecting a RF discovery loop based on the determined first duration and second duration. Moreover, the method can include performing peer mode discovery using the selected RF discovery loop.

Another aspect relates to a communications apparatus. The wireless communications apparatus can include means for detecting a value for a power level available to operate a NFC device. Further, the communications apparatus can include means for determining a first duration to allocate for a listening mode and a second duration to allocate for a polling mode based at least in part on the determined available power level value. Further, the communications apparatus can include means for selecting a RF discovery loop based on the determined first duration and second duration. Moreover, the communications apparatus can include means for performing peer mode discovery using the selected RF discovery loop.

Another aspect relates to an apparatus for NFC communications. The apparatus can include a power supply, a memory, and a processor coupled to the memory. The apparatus may further include a RF discovery loop selection module coupled to at least one of the memory or the processor and configured to detect a value for a power level available for operation using the power supply. Further, the RF discovery loop selection module may be configured to determine a first duration to allocate for a listening mode and a second duration to allocate for a polling mode based at least in part on the determined available power level value. Further, the RF discovery loop selection module may be configured to select a RF discovery loop based on the determined first duration and second duration. Moreover, the RF discovery loop selection module may be configured to perform peer mode discovery using the selected RF discovery loop.

Another aspect relates to a computer program product, which can have a computer-readable medium comprising code for detecting a value for a power level available to operate a NFC device. Further, the computer-readable medium can include code for selecting a RF discovery loop based on the determined first duration and second duration. Further, the computer-readable medium can include code for selecting a RF discovery loop based on the determined first duration and second duration. Moreover, the computer-readable medium can include code for performing peer mode discovery using the selected RF discovery loop.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Generally, a device may recognize a NFC target device and/or tag when within range of the coverage area of the NFC device and/or tag. Thereafter, the device may obtain sufficient information to allow for communications to be established. One form of communications that may be established is a peer-to-peer communications link. As described herein, communications enabled over a peer-to-peer communications link may use a passive communications mode. In a passive communicate mode, each peer maintains its status as a polling device or a listening device for the entirety of the established link. Further, power expenditures for a device maintained in a polling mode are disproportionately greater than power expenditures for a device maintained in a listening mode during the peer-to-peer communications link.

Figure 1:
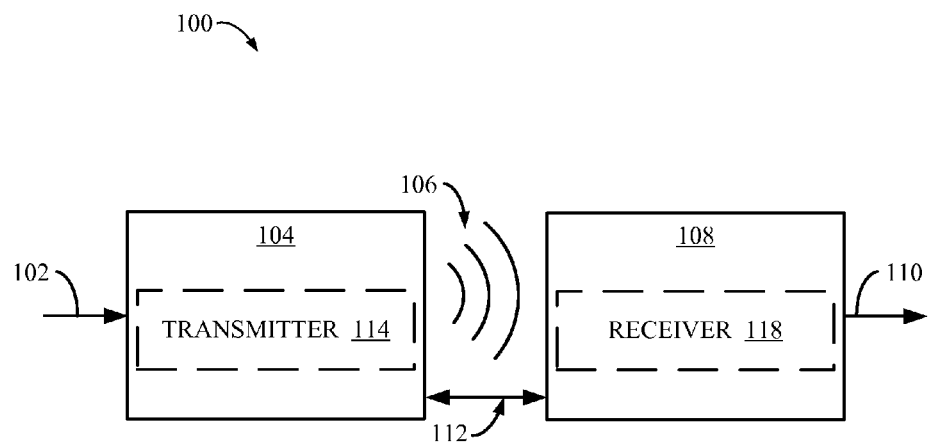
FIG. 1 illustrates a simplified block diagram of a near field wireless communication system according to an aspect.

FIG. 1 illustrates a wireless communication system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
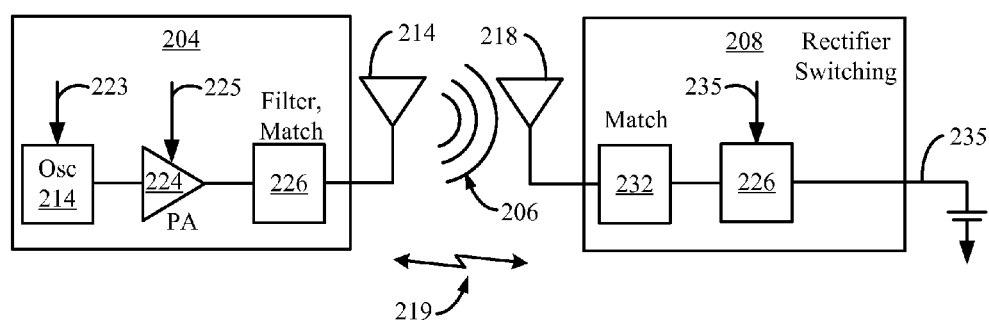
FIG. 2 illustrates a simplified schematic diagram of a near field communication transfer system according to an aspect.

FIG. 2 shows a simplified schematic diagram of a near field wireless communication system. The transmitter 204 includes an oscillator 222, a power amplifier 224 and a filter and matching circuit 226. The oscillator is configured to generate a signal at a desired frequency, which may be adjusted in response to adjustment signal 223. The oscillator signal may be amplified by the power amplifier 224 with an amplification amount responsive to control signal 225. The filter and matching circuit 226 may be included to filter out harmonics or other unwanted frequencies and match the impedance of the transmitter 204 to the transmit antenna 214.

The receiver 208 may include a matching circuit 232 and a rectifier and switching circuit 234 to generate a DC power output to charge a battery 236 as shown in FIG. 2 or power a device coupled to the receiver (not shown). The matching circuit 232 may be included to match the impedance of the receiver 208 to the receive antenna 218. The receiver 208 and transmitter 204 may communicate on a separate communication channel 219 (e.g., Bluetooth, zigbee, cellular, etc).

Figure 3:
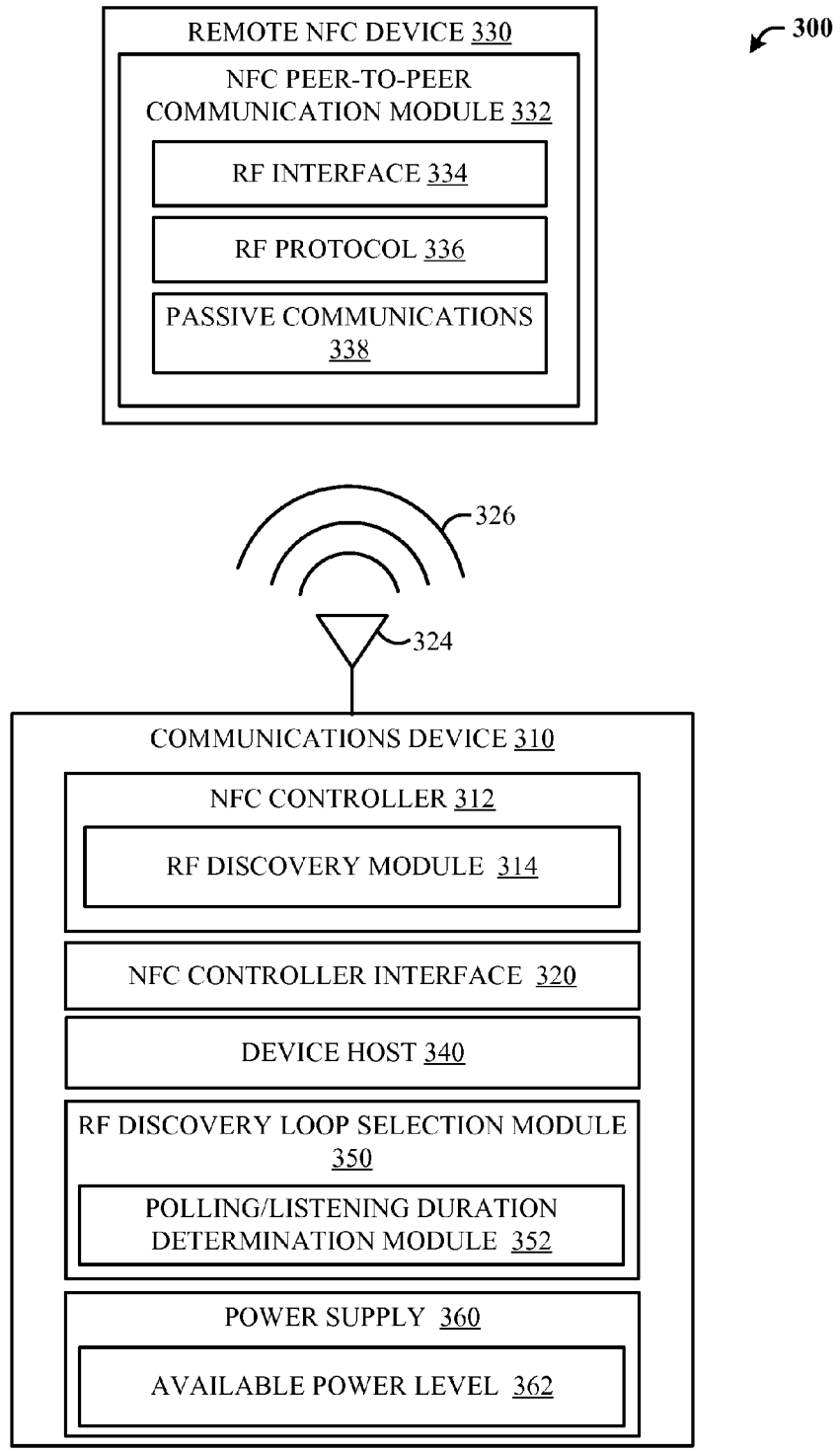
FIG. 3 illustrates a block diagram of a NFC environment according to an aspect.

With reference to FIG. 3, a block diagram of a communication network 300 according to an aspect is illustrated. Communication network 300 may include communications devices 310 which, through antenna 324, may be in communication with a remote NFC device 330 using one or more NFC technologies 326 (e.g., NFC-A, NFC-B, NFC-F, etc.). In one aspect, remote NFC device 330 and/or communication device 310 may be operable to communicate through NFC peer-to-peer communication module 332 through one or more RF interfaces 334 using one or more RF protocols 336, in a passive communication mode 338. In another aspect, communications device 310 may be operable to be connected to an access network and/or core network (e.g., a CDMA network, a GPRS network, a UMTS network, and other types of wireline and wireless communication networks). In one aspect, remote NFC device 330 may include but is not limited to a remote NFC tag, a reader/writer device, a peer initiator device, a remote peer target device, etc.

Communication device 310 may include NCI 320. In one aspect, NCI 320 may be operable to enable communications between a NFC enabled antenna and NFC controller 312.

Communications device 310 may include a NFC controller (NFCC) 312. In one aspect, NFCC 312 may include RF discovery module 314. RF discovery module 314 may be operable to perform RF discovery using a RF discovery loop as part of a discovery process to enable peer mode communications. DH 340 may be operable to generate a command to prompt NFCC 312 to perform various functions associated with RF discovery.

Communications device 310 may include RF discovery loop selection module 350. RF discovery loop selection module 350 may be operable to select a RF discovery loop to use during the RF discovery process. As used herein, a RF discovery loop may refer to a time duration that includes one or more sub-durations allocated for at least one of listening mode and/or for polling mode operations during a NFC peer communications discovery process. In one aspect, the RF discovery loop may be selected from one or more RF discovery loop options store on communications device 310. In another aspect, RF discovery loop selection module 350 may select an RF discovery loop based on one or more factors, such as but not limited to, a user input, a device location, a device orientation, a device motion, or a history of power consumption, or any combination thereof. In one aspect, RF discovery loop selection module 350 may include polling mode and/or listening module duration determination module 352. Polling mode and/or listening module duration determination module 352 may be operable to determine a duration during which communications device 310 is operable in at least one of a polling mode or listening mode. In one aspect, polling mode and/or listening module duration determination module 352 may determine a duration length for polling and/or listening mode operations through analysis of an available power level 362 associated with power supply 360 used to operate communications device 310.

In one operational aspect, when an available power level 362 is below a low threshold (e.g., less than 20% battery life remaining), then polling mode and/or listening module duration determination module 352 may determine a duration length for a listening mode that is greater than a length for a polling mode. Thereafter, RF discovery loop selection module 350 may select a RF discovery loop that includes the determined duration lengths for listening and polling, and the communications device 310 may use the selected RF discovery loop to perform RF discovery. In such an aspect, as a greater time duration is allocated for listening during the RF discovery loop, the communications device 310 has a greater chance of connecting with a remote NFC device 330 as a listening device, and thereby potentially reducing power requirements associated with the peer communications.

In another operational aspect, when an available power level 362 is above a high threshold (e.g., greater than 80% battery life remaining), then polling mode and/or listening module duration determination module 352 may determine a duration length for a polling mode that is greater than a length for a listening mode. Thereafter, RF discovery loop selection module 350 may select a RF discovery loop that includes the determined duration lengths for listening and polling, and the communications device 310 may use the selected RF discovery loop to perform RF discovery. In such an aspect, as a greater time duration is allocated for polling during the RF discovery loop, the communications device 310 has a greater chance of connecting with a remote NFC device 330 as a polling device, and thereby potentially reducing power requirements for the remote NFC device 330 associated with the peer communications.

In still another operational aspect, when an available power level 362 indicates that a device is charging and/or associated with a substantially continuous power supply (e.g., plugged in to a power outlet), then polling mode and/or listening module duration determination module 352 may determine a duration length for a polling mode that is a substantial majority of time available in an RF discovery loop (e.g., 90%). Thereafter, RF discovery loop selection module 350 may select a RF discovery loop that includes the determined duration lengths for at least polling, and the communications device 310 may use the selected RF discovery loop to perform RF discovery. In such an aspect, as a greater time duration is allocated for polling during the RF discovery loop, the communications device 310 has a greater chance of connecting with a remote NFC device 330 as a polling device, and thereby potentially reducing power requirements for the remote NFC device 330 associated with the peer communications.

Therefore, a system and method is disclosed to provide improved RF discovery for peer mode passive communications between communications device 310 and remote NFC device 330.

Figure 4:
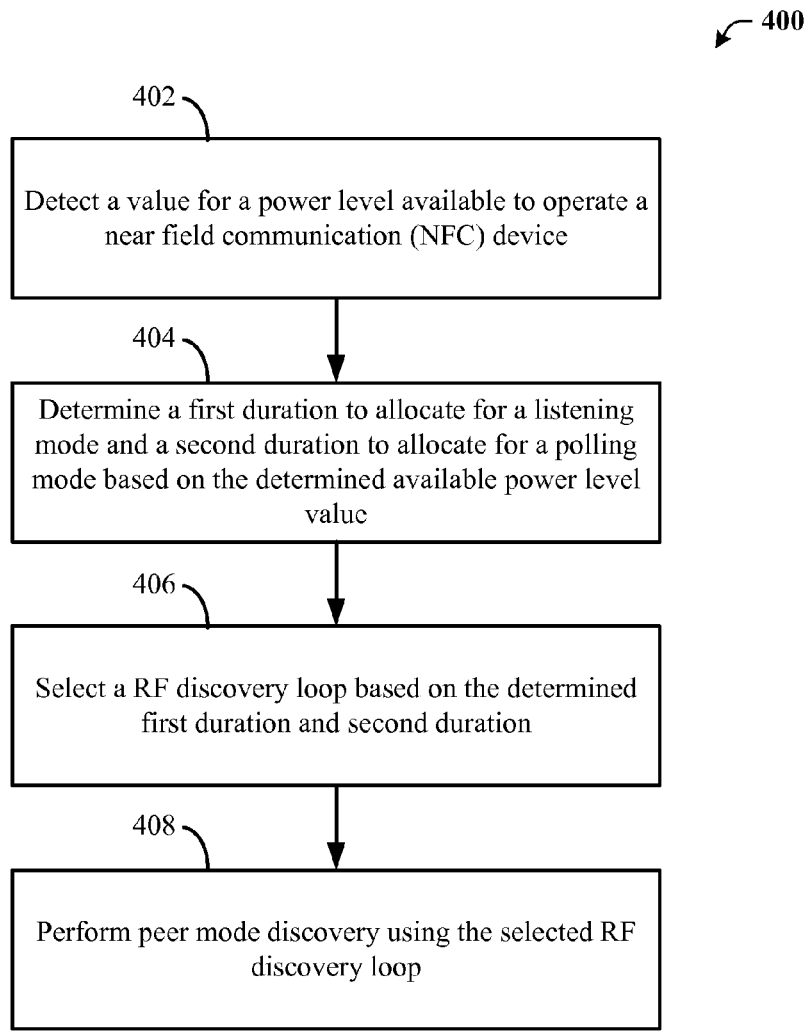
FIG. 4 illustrates a flowchart describing an example system for improving RF discovery for peer mode passive communications according to an aspect.
Figure 5:
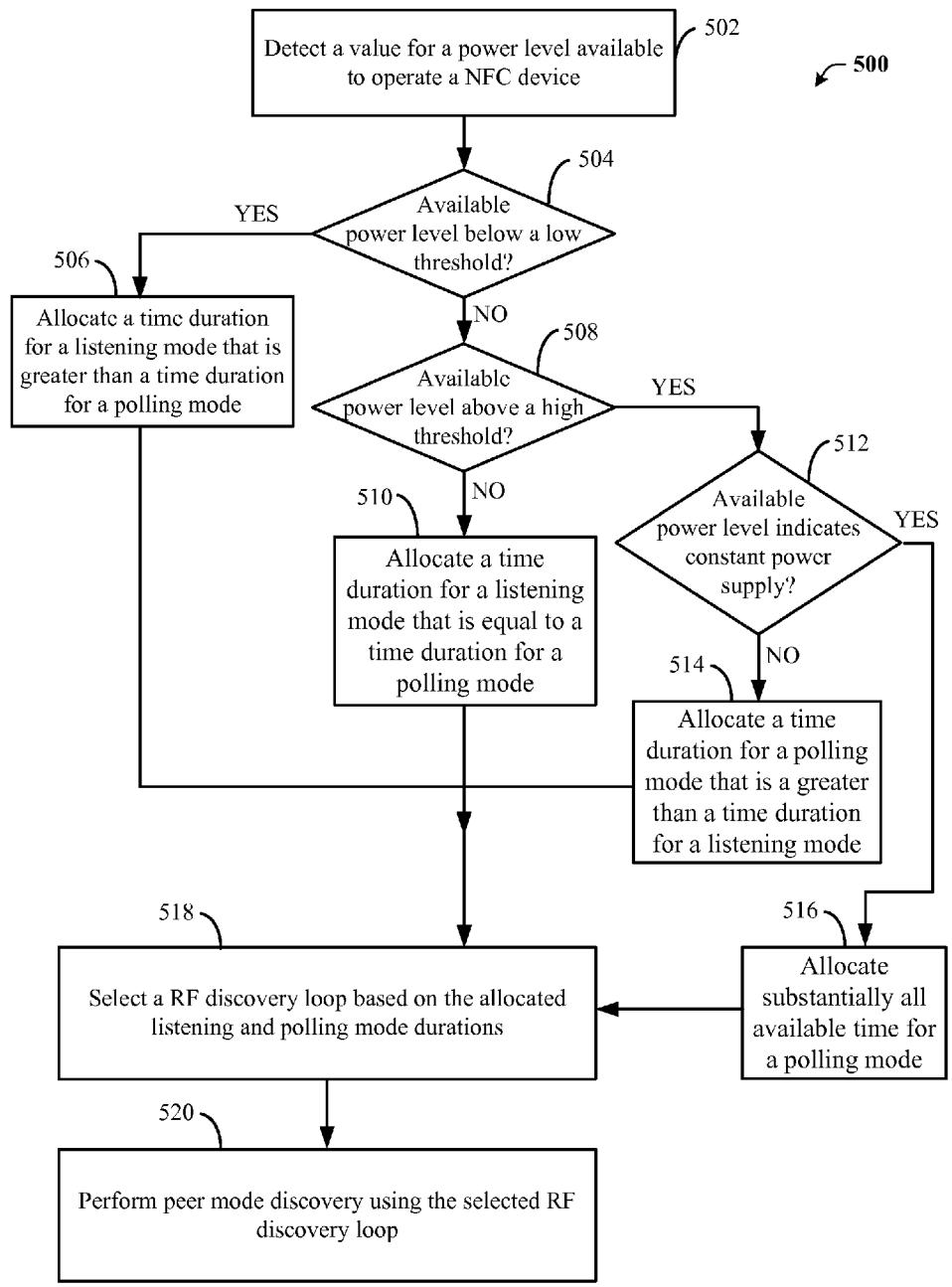
FIG. 5 illustrates a flowchart describing another example system for improving RF discovery for peer mode passive communications according to an aspect.

FIGS. 4-5 illustrate various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 4 depicts an example flowchart describing a process 400 for improving RF discovery for peer mode passive communications.

At block 402, a NFC device may detect a value for a power level available to operate the NFC. In one aspect, the value may indicate a percentage of battery life remaining for operating the NFC device. In another aspect, the value may indicate a number of hours of battery life remaining for operating the NFC device. In another aspect, the value may indicate whether the NFC device is coupled to a substantially constant power supply (e.g., charging, connected to power outlet, etc.).

At block 404, the NFC device may determine a first duration to allocate for a listening mode and a second duration to allocate for a polling mode based at least in part on the determined available power level value. In one aspect, where the available power level value is less than or equal to a first threshold (e.g., a low threshold), the NFC device may determine to allocate a greater time for the first duration than the second duration. In another aspect, where the available power level value is greater than a second threshold (e.g., a high threshold), the NFC device may determine to allocate a greater time for the second duration than the first duration. In another aspect, where the available power level value indicates that the device is charging, the NFC device may determine to allocate a greater time for the second duration than the first duration. In another aspect, where the available power level value indicates that the device is coupled to a substantially continuous power supply, the NFC device may determine to allocate substantially all time available in an RF discovery loop to the second duration. In still another aspect, where the available power level value indicates a percentage of available power, then the device may apply the available power level percentage to indicate a percentage of time within a RF discovery loop that the device allocates for a polling mode. In another aspect, the NFC device may determine the first and second duration based on one or more additional factors, such as but not limited to, a user input, a device location, a device orientation, a device motion, a history of power consumption, etc., or any combination thereof.

At block 406, the NFC device may select an RF discovery loop based on the determined first duration and second duration. In one aspect, the RF discovery loop may be selected from one or more of RF discovery loops stored on the NFC device. In such an aspect, each RF discovery loop stored on the NFC device may be defined by a different first duration and second duration. In another aspect, each RF discovery loop stored on the NFC device may be defined by a different frequency of occurrence for the first duration and for the second duration.

At block 408, the NFC device may perform peer mode discovery using the selected RF discovery loop.

FIG. 5 depicts an example flowchart describing another process 500 for improving RF discovery for peer mode passive communications.

At block 502, a NFC device may detect a value for a power level available to operate the NFC. In one aspect, the value may indicate a percentage of battery life remaining for operating the NFC device. In another aspect, the value may indicate a number of hours of battery life remaining for operating the NFC device. In another aspect, the value may indicate whether the NFC device is coupled to a substantially constant power supply (e.g., charging, connected to power outlet, etc.).

At block 504, the NFC device determines if the available power level value is below a first threshold (e.g., low threshold). If at block 504, the NFC device determines that the available power level value is below the low threshold, then at block 506, the NFC device may allocate a time duration for a listening mode that is greater than a time duration allocated for a polling mode in an RF discovery loop.

By contrast, if at block 504 the NFC device determines that the available power level value is not below a low threshold, then at block 508 the NFC device determines whether the available power level value is above a second threshold (e.g., a high threshold). If at block 508, the NFC device determines that the available power level is not above the high threshold, then at block 510 the NFC device may allocate approximately the same time durations for a polling mode and a listening mode in an RF discovery loop. In one aspect, a default RF discovery loop may be used when the available power level is above a low threshold and below a high threshold.

By contrast, if at block 508, the NFC device determines that the available power level value is above the high threshold, then at block 512, the NFC device may determine whether the available power level value indicates that the device is coupled to a substantially constant power supply. If at block 512, the NFC device determines that the available power level value does not indicate that the device is coupled to a substantially constant power supply, then at block 514 the NFC device may allocate a time duration for a polling mode that is greater than a time duration allocated for a listening mode in an RF discovery loop. If at block 512, the NFC device determines that the available power level value does indicate that the device is coupled to a substantially constant power supply, then at block 516 the NFC device may allocate substantially all available time for a polling mode.

At block 518, the NFC device may select an RF discovery loop based on the determined first duration and second duration. In one aspect, the RF discovery loop may be selected from a plurality of RF discovery loops stored on the NFC device. In such an aspect, each RF discovery loop stored on the NFC device may be defined by a different first duration and second duration. In another aspect, each RF discovery loop stored on the NFC device may be defined by a different frequency of occurrence for the first duration and for the second duration.

At block 520, the NFC device may perform peer mode discovery using the selected RF discovery loop.

Figure 6:
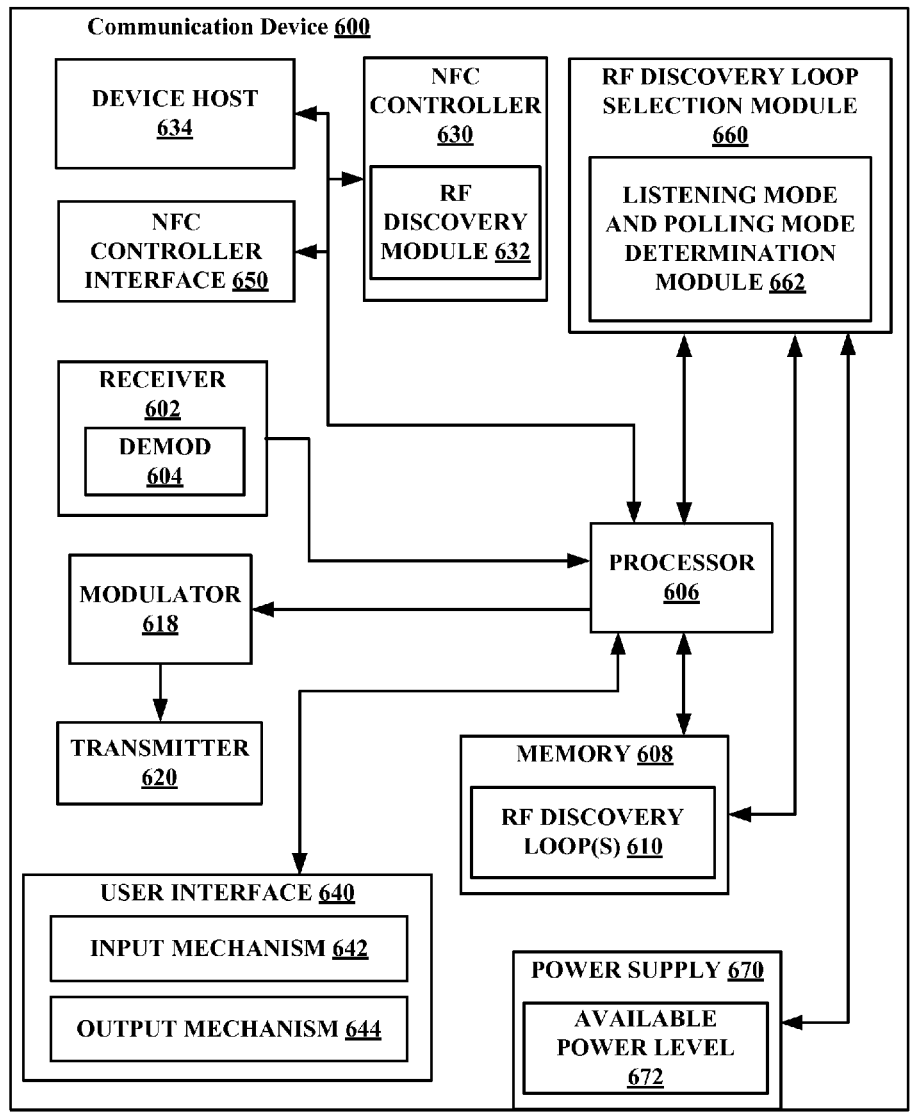
FIG. 6 illustrates a block diagram example architecture of a communications device, according to an aspect.

While referencing FIG. 3, but turning also now to FIG. 6, an example architecture of communications device 600 is illustrated. As depicted in FIG. 6, communications device 600 comprises receiver 602 that receives a signal from, for instance, a receive antenna (not shown), performs typical actions on (e.g., filters, amplifies, downconverts, etc.) the received signal, and digitizes the conditioned signal to obtain samples. Receiver 602 can comprise a demodulator 604 that can demodulate received symbols and provide them to processor 606 for channel estimation. Processor 606 can be a processor dedicated to analyzing information received by receiver 602 and/or generating information for transmission by transmitter 620, a processor that controls one or more components of device 600, and/or a processor that both analyzes information received by receiver 602, generates information for transmission by transmitter 620, and controls one or more components of communications device 600. Further, signals may be prepared for transmission by transmitter 620 through modulator 618 which may modulate the signals processed by processor 606.

Communications device 600 can additionally comprise memory 608 that is operatively coupled to various components, such as but not limited processor 606 and that can store data to be transmitted, received data, information related to available channels, TCP flows, data associated with analyzed signal and/or interference strength, information related to an assigned channel, power, rate, or the like, and any other suitable information for assisting in NFC peer mode connection establishment. In one aspect, memory 608 may include one or more RF discovery loops 610. In one aspect, each RF discovery loop 610 stored on the NFC device 600 may be defined by a different first duration and second duration. In another aspect, each RF discovery loop 610 stored on the NFC device may be defined by a different frequency of occurrence for the first duration and for the second duration.

Further, processor 606, device host 634, NFCC 630, and/or RF discovery loop selection module 660 can provide means for detecting a value for a power level available to operate a NFC device, means for determining a first duration to allocate for a listening mode and a second duration to allocate for a polling mode based at least in part on the determined available power level value, means for selecting a RF discovery loop based on the determined first duration and second duration, and means for performing peer mode discovery using the selected RF discovery loop.

It will be appreciated that data store (e.g., memory 608) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 608 of the subject systems and methods may comprise, without being limited to, these and any other suitable types of memory.

Device 600 may include a NFC controller 630. In one aspect, NFCC 630 may include RF discovery module 632. RF discovery module 632 may be operable to perform RF discovery using a RF discovery loop (e.g., 610) as part of a discovery process to enable peer mode communications. DH 634 may be operable to generate a command to prompt NFCC 630 to perform various NFC actions, such as but not limited to, RF discovery, etc.

In another aspect, communication device 600 may include NCI 650. In one aspect, NCI 650 may be operable to enable communications between a NFC enabled antenna (e.g., 602, 620), NFC controller 630 and DH 634. NCI 650 may be operable to function in a listening mode and/or a polling mode.

In another aspect, communications device 600 may include RF discovery loop selection module 660. RF discovery loop selection module 660 may be operable to select a RF discovery loop to use during the RF discovery process. In one aspect, the RF discovery loop may be selected from one or more RF discovery loop 610 options store in memory 608 on communications device 600. In another aspect, RF discovery loop selection module 660 may select an RF discovery loop 610 based on one or more factors, such as but not limited to, a user input, a device location, a device orientation, a device motion, or a history of power consumption, or any combination thereof. In one aspect, RF discovery loop selection module 660 may include polling mode and/or listening module duration determination module 662. Polling mode and/or listening module duration determination module 662 may be operable to determine a duration during which communications device 600 is operable in at least one of a polling mode or listening mode. In one aspect, polling mode and/or listening module duration determination module 662 may determine a duration length for polling and/or listening mode operations through analysis of an available power level 672 associated with power supply 670 used to operate communications device 600. Power supply 670 may include, but is not limited to, a power outlet connection point, a battery, etc. In another aspect, RF discovery loop selection module 660 operable to perform RF discovery processes described with respect to FIGS. 4-5.

Additionally, communications device 600 may include user interface 640. User interface 640 may include input mechanisms 642 for generating inputs into communications device 600, and output mechanism 644 for generating information for consumption by the user of the communications device 600. For example, input mechanism 642 may include a mechanism such as a key or keyboard, a mouse, a touch-screen display, a microphone, etc. Further, for example, output mechanism 644 may include a display, an audio speaker, a haptic feedback mechanism, a Personal Area Network (PAN) transceiver etc. In the illustrated aspects, the output mechanism 644 may include a display operable to present media content that is in image or video format or an audio speaker to present media content that is in an audio format.

Figure 7:
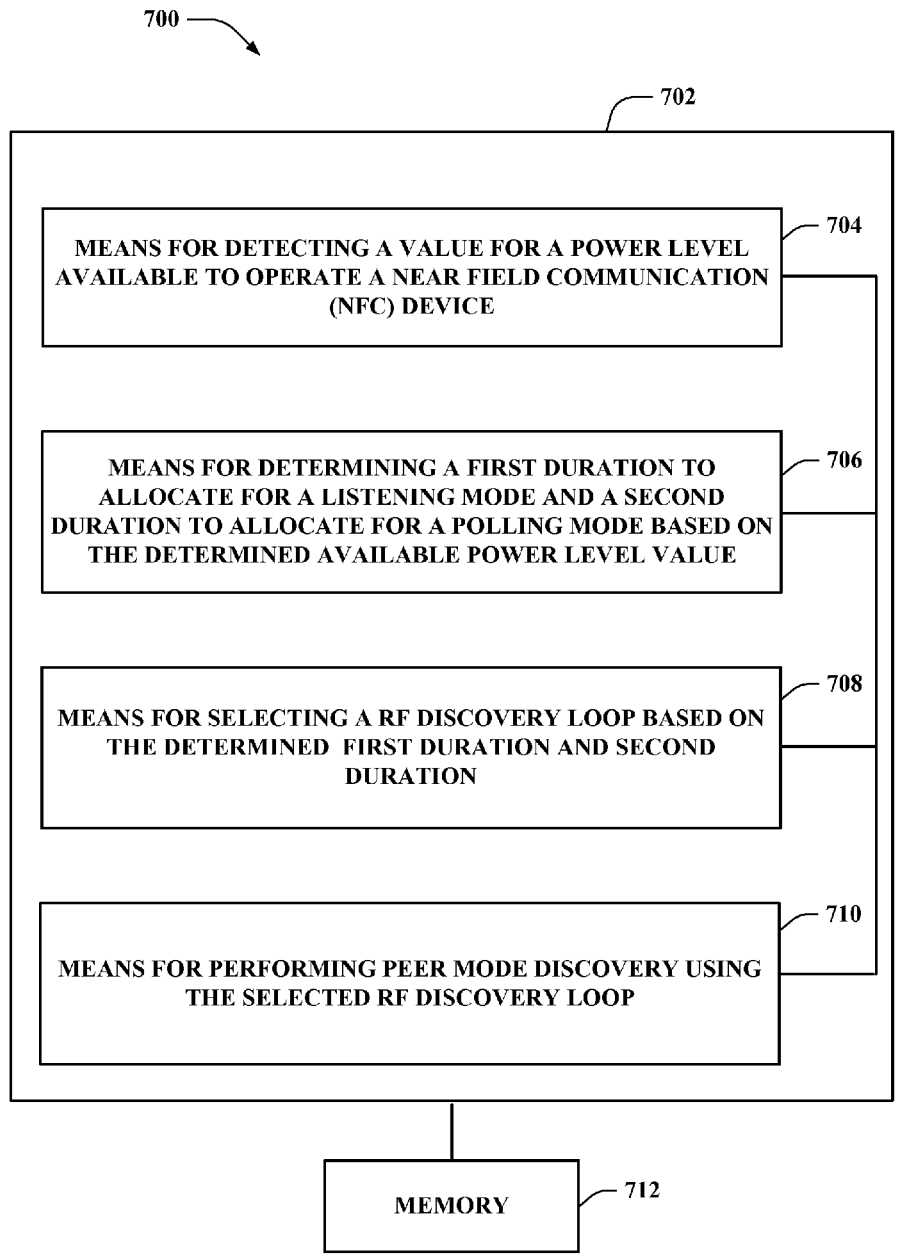
FIG. 7 illustrates a block diagram of an example communication system for using an enriched user profile, according to an aspect.

FIG. 7 depicts another depicts a block diagram of an exemplary communication system 700 operable to provide peer mode passive communications that take into account a power level available to operate a NFC device, according to an aspect. For example, system 700 can reside at least partially within a communications device (e.g., communications device 600). It is to be appreciated that system 700 is represented as including functional blocks, which can be functional blocks that represent functions implemented by a processor, software, or combination thereof (e.g., firmware). System 700 includes a logical grouping 702 of electrical components that can act in conjunction.

For instance, logical grouping 702 can include an electrical component that may provide means for detecting a value for a power level available to operate a NFC device 704. In one aspect, the value may indicate a percentage of battery life remaining for operating the NFC device. In another aspect, the value may indicate a number of hours of battery life remaining for operating the NFC device. In another aspect, the value may indicate whether the NFC device is coupled to a substantially constant power supply (e.g., charging, connected to power outlet, etc.).

Further, logical grouping 702 can include an electrical component that may provide means for determining a first duration to allocate for a listening mode and a second duration to allocate for a polling mode based at least in part on the determined available power level value 706. In one aspect, where the available power level value is less than or equal to a first threshold (e.g., a low threshold), the NFC device may determine to allocate a greater time for the first duration than the second duration. In another aspect, where the available power level value is greater than a second threshold (e.g., a high threshold), the NFC device may determine to allocate a greater time for the second duration than the first duration. In another aspect, where the available power level value indicates that the device is charging, the NFC device may determine to allocate a greater time for the second duration than the first duration. In another aspect, where the available power level value indicates that the device is coupled to a substantially continuous power supply, the NFC device may determine to allocate substantially all time available in an RF discovery loop to the second duration. In still another aspect, where the available power level value indicates a percentage of available power, then the device may apply the available power level percentage to indicate a percentage of time within a RF discovery loop that the device allocates for a polling mode. In another aspect, the NFC device may determine the first and second duration based on one or more additional factors, such as but not limited to, a user input, a device location, a device orientation, a device motion, a history of power consumption, etc., or any combination thereof.

Still further, logical grouping 702 can include an electrical component that may provide means for selecting a RF discovery loop based on the determined first duration and second duration 708. In one aspect, the RF discovery loop may be selected from one or more of RF discovery loops stored on the NFC device. In such an aspect, each RF discovery loop stored on the NFC device may be defined by a different first duration and second duration. In another aspect, each RF discovery loop stored on the NFC device may be defined by a different frequency of occurrence for the first duration and for the second duration.

Moreover, logical grouping 702 can include an electrical component that may provide means for performing peer mode discovery using the selected RF discovery loop 710.

Additionally, system 700 can include a memory 712 that retains instructions for executing functions associated with the electrical components 704, 706, 708, and 710, stores data used or obtained by the electrical components 704, 706, 708, 710, etc. While shown as being external to memory 712, it is to be understood that one or more of the electrical components 704, 706, 708, and 710 may exist within memory 712. In one example, electrical components 704, 706, 708, and 710 can include at least one processor, or each electrical component 704, 706, 708, and 710 can be a corresponding module of at least one processor. Moreover, in an additional or alternative example, electrical components 704, 706, 708, and 710 may be a computer program product including a computer readable medium, where each electrical component 704, 706, 708, and 710 may be corresponding code.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, mobile equipment (ME), remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH, near-field communications (NFC-A, NFC-B, NFC,-f, etc.), and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC.

Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method of wireless communications, comprising:
   detecting by a communication device a power level available to operate a near field communication (NFC) device;
   determining a first duration to allocate for a listening mode and a second duration to allocate for a polling mode based at least in part on the detected available power level;
   selecting a RF discovery loop from a plurality of RF discovery loops based on the determined first duration and second duration; and
   performing peer mode discovery using the selected RF discovery loop.

2. The method of claim 1, wherein the plurality of RF discovery loops is stored on the NFC device.

3. The method of claim 2, wherein each RF discovery loop stored on the NFC device is defined by a different first duration and second duration.

4. The method of claim 2, wherein each RF discovery loop stored on the NFC device is characterized by a different frequency of occurrence for the first duration and for the second duration.

5. The method of claim 1, wherein the available power level is less than or equal to a first threshold; and
   wherein the determining the first and second durations further comprises allocating a greater time for the first duration than the second duration.

6. The method of claim 1, wherein the available power level is greater than a second threshold; and
   wherein the determining the first and second durations further comprises allocating a greater time for the second duration than the first duration.

7. The method of claim 1, wherein the available power level indicates that the device is charging; and
   wherein the determining the first and second durations further comprises determining the first and second durations based at least in part on the indication that the device is charging.

8. The method of claim 1, wherein the available power level indicates that the device is coupled to a substantially continuous power supply; and
   wherein the determining the first and second durations further comprises determining the first and second durations based at least in part on the indication that the device is coupled to the substantially continuous power supply.

9. The method of claim 1, wherein the available power level indicates a percentage value of power available from a battery; and
   wherein the determining the first and second durations further comprises allocating a percentage of time to the second duration that is substantially equal to the percentage value indicating the available power level.

10. The method of claim 1, wherein the determining the first and second durations is further based on at least one of a user input, a device location, a device orientation, a device motion, or a history of power consumption.

11. A computer program product, comprising:
    a non-transitory computer-readable medium comprising code for:
      detecting a power level available to operate a near field communication (NFC) device;
      determining a first duration to allocate for a listening mode and a second duration to allocate for a polling mode based at least in part on the detected available power level;
      selecting a RF discovery loop from a plurality of RF discovery loops based on the determined first duration and second duration; and
      performing peer mode discovery using the selected RF discovery loop.

12. The computer program product of claim 11, wherein the plurality of RF discovery loops is stored on the NFC device.

13. The computer program product of claim 12, wherein each RF discovery loop stored on the NFC device is defined by a different first duration and second duration.

14. The computer program product of claim 12, wherein each RF discovery loop stored on the NFC device is characterized by a different frequency of occurrence for the first duration and for the second duration.

15. The computer program product of claim 11, wherein the available power level is less than or equal to a first threshold; and
   wherein the computer-readable medium further comprises code for allocating a greater time for the first duration than the second duration.

16. The computer program product of claim 11, wherein the available power level is greater than a second threshold; and
   wherein the computer-readable medium further comprises code for allocating a greater time for the second duration than the first duration.

17. The computer program product of claim 11, wherein the available power level indicates that the device is charging; and
   wherein the computer-readable medium further comprises code for determining the first and second durations based at least in part on the indication that the device is charging.

18. The computer program product of claim 11, wherein the available power level indicates that the device is coupled to a substantially continuous power supply; and
   wherein the computer-readable medium further comprises code for determining the first and second durations based at least in part on the indication that the device is coupled to the substantially continuous power supply.

19. The computer program product of claim 18, wherein the available power level indicates a percentage value of power available from a battery; and
   wherein the computer-readable medium further comprises code for allocating a percentage of time to the second duration that is substantially equal to the percentage value indicating the available power level.

20. The computer program product of claim 11, wherein the computer-readable medium further comprises code for:
   determining the first and second durations is further based on at least one of a user input, a device location, a device orientation, a device motion, or a history of power consumption.

21. An apparatus, comprising:
   means for detecting a power level available to operate a near field communication (NFC) device;
   means for determining a first duration to allocate for a listening mode and a second duration to allocate for a polling mode based at least in part on the detected available power level;
   means for selecting a RF discovery loop from a plurality of RF discovery loops based on the determined first duration and second duration; and
   means for performing peer mode discovery using the selected RF discovery loop.

22. The apparatus of claim 21, wherein the plurality of RF discovery loops is stored on the NFC device.

23. The apparatus of claim 22, wherein each RF discovery loop stored on the NFC device is characterized by a different first duration and second duration.

24. The apparatus of claim 22, wherein each RF discovery loop stored on the NFC device is defined by a different frequency of occurrence for the first duration and for the second duration.

25. The apparatus of claim 21, wherein the available power level is less than or equal to a first threshold; and
   wherein the means for determining the first and second durations further comprises means for allocating a greater time for the first duration than the second duration.

26. The apparatus of claim 21, wherein the available power level is greater than a second threshold; and
   wherein the means for determining the first and second durations further comprises means for allocating a greater time for the second duration than the first duration.

27. The apparatus of claim 21, wherein the available power level indicates that the device is charging; and
   wherein the means for determining the first and second durations further comprises means for determining the first and second durations based at least in part on the indication that the device is charging.

28. The apparatus of claim 21, wherein the available power level value indicates that the device is coupled to a substantially continuous power supply; and
   wherein the means for determining the first and second durations further comprises means for determining the first and second durations based at least in part on the indication that the device is coupled to the substantially continuous power supply.

29. The apparatus of claim 21, wherein the available power level indicates a percentage value of power available from a battery; and
   wherein the means for determining the first and second durations further comprises means for allocating a percentage of time to the second duration that is substantially equal to the percentage value indicating the available power level.

30. The apparatus of claim 21, wherein the means for determining the first and second durations is further based on at least one of a user input, a device location, a device orientation, a device motion, or a history of power consumption.

31. An apparatus for NFC communications, comprising:
   a power supply;
   a memory;
   a processor coupled to the memory; and
   a RF discovery loop selection module coupled to at least one of the memory or the processor and configured to:
      detect a power level available for operation using the power supply;
      determine a first duration to allocate for a listening mode and a second duration to allocate for a polling mode based at least in part on the detected available power level;
      select a RF discovery loop from a plurality of RF discovery loops based on the determined first duration and second duration; and
      perform peer mode discovery using the selected RF discovery loop.

32. The apparatus of claim 31, wherein the plurality of RF discovery loops is stored on the NFC device.

33. The apparatus of claim 32, wherein each RF discovery loop stored in the memory on the NFC device is defined by a different first duration and second duration.

34. The apparatus of claim 32, wherein each RF discovery loop stored in the memory on the NFC device is characterized by a different frequency of occurrence for the first duration and for the second duration.

35. The apparatus of claim 31, wherein the available power level associated with the power supply is less than or equal to a first threshold; and
   wherein the RF discovery loop selection module is further configured to allocate a greater time for the first duration than the second duration.

36. The apparatus of claim 31, wherein the available power level associated with the power supply is greater than a second threshold; and wherein the RF discovery loop selection module is further configured to allocate a greater time for the second duration than the first duration.

37. The apparatus of claim 31, wherein the available power level associated with the power supply indicates that the device is charging; and wherein the RF discovery loop selection module is further configured to determine the first and second durations based at least in part on the indication that the device is charging.

38. The apparatus of claim 31, wherein the available power level associated with the power supply indicates that the device is coupled to a substantially continuous power supply; and wherein the RF discovery loop selection module is further configured to determine the first and second durations based at least in part on the indication that the device is coupled to the substantially continuous power supply.

39. The apparatus of claim 31, wherein the available power level indicates a percentage value of power available from a battery; and wherein the RF discovery loop selection module is further configured to allocate a percentage of time to the second duration that is substantially equal to the percentage value indicating the available power level.

40. The apparatus of claim 31, wherein the RF discovery loop selection module is further configured to determine the first and second durations is further based on at least one of a user input, a device location, a device orientation, a device motion, or a history of power consumption.

* * * * *